Figures 1, 2:
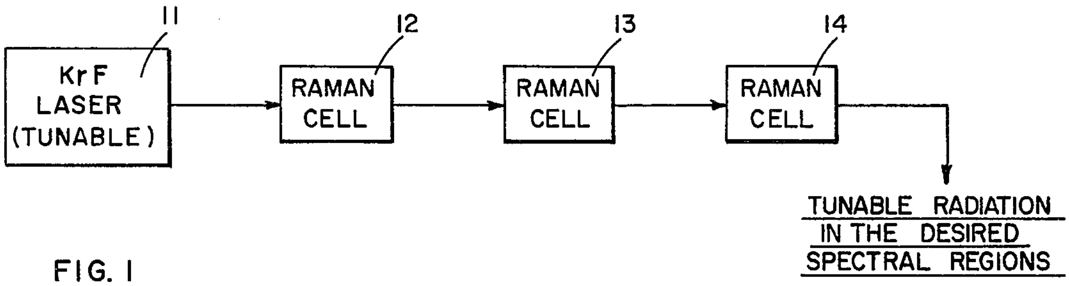

United States Patent [19]

Stappaerts

[11] 4,254,348

[45] Mar. 3, 1981

[54] TUNABLE ULTRA-VIOLET GENERATOR FOR USE IN THE ISOTOPE SEPARATION OF DEUTERIUM

[75] Inventor: Eddy A. Stappaerts, Redondo Beach, Calif.

[73] Assignee: Northrop Corporation, Los Angeles, Calif.

[21] Appl. No.: 13,245

[22] Filed: Feb. 21, 1979

[51] Int. Cl.[3] .................................... H03F 7/00

[52] U.S. Cl. .................................... 307/426

[58] Field of Search .................................... 307/426

[56] References Cited

U.S. PATENT DOCUMENTS 3,371,265 2/1968 Woodbury et al. ............ 307/426 X

*Primary Examiner*—Rudolph V. Rolinec

*Assistant Examiner*—Darwin R. Hostetter

*Attorney, Agent, or Firm*—Edward A. Sokolski

[57] ABSTRACT

The frequency of the output beam of a high power krypton fluoride laser is shifted by a plurality of Raman cells arranged successively in the path of the laser beams. These cells each contain a gas selected from the following gases: $H_2$, HD, $D_2$ and $CH_4$, the combination of the gases used being chosen to provide a frequency shift of the beam so as to produce an output in the 330-355 nm range, which is suitable for use in photo-predissociation of formaldehyde (HDCO) so as to produce heavy water ($D_2O$).

9 Claims, 2 Drawing Figures

| GASES IN RAMAN CELLS | COMBINED SHIFT ($cm^{-1}$) | TUNABILITY RANGE (nm) |
|---|---|---|
| $H_2$ - $D_2$ - $D_2$ | 10138 | 330.4 – 333.7 |
| | | |
| HD - HD - $D_2$ | 10232 | 331.4 – 334.7 |
| $H_2$ - HD - $CH_4$ | 10689 | 336.5 – 339.9 |
| | | |
| $H_2$ - $H_2$ - $CH_4$ | 11224 | 342.7 – 346.2 |
| | | |
| $H_2$ - HD - HD | 11396 | 344.7 – 348.3 |
| $H_2$ - $H_2$ - HD | 11931 | 351.2 – 354.9 |

TUNABLE ULTRA-VIOLET GENERATOR FOR USE IN THE ISOTOPE SEPARATION OF DEUTERIUM

There is great interest in finding an efficient and economical technique for producing heavy water ($D_2O$) in view of the potential of $D_2O$ moderated reactors as thermal near-breeders operating on the Thorium-Uranium cycle. This approach to nuclear power can extend the available uranium supplies and might thereby postpone indefinitely the introduction of the Plutonium cycle. Work is being done in the search for a practical technique for laser isotope separation (LIS) of deuterium at Lawrence Livermore Laboratory (see Chem. Phys. Letters, 35, 84(1975), "Laser Isotope Separation of Deuterium", by J. B. Marling), at the Brookhaven National Laboratory, and in Israel at the Israel Institute of Technology (Appl. Phys. Letters, 29, 40(1976), "Deuterium Separation in Formaldehyde by an Intense Pulsed $CO_2$ Laser", G. Koren et al.). The techniques which appear to have the most promise for the production of heavy water by laser isotope separation (LIS) involve the one-step photo predissociation of formaldehyde vapor by means of a high power laser beam having an output in the uv range with limited tunability between 330 and 335 nm.

It is to be noted that for the successful photo predissociation of formaldehyde, a very high power narrow band radiation is required in the desired range (300–355 nm). The only technique known in the prior art for generating continuously tunable radiation in this range makes use of a dye laser employing the dye paraterphènyl. Because liquids rather than gases are used in this system, there is strong question that such a system will be scalable to average powers which exceed several hundred watts, which is far below the power required for the efficient photo predissociation of formaldehyde (HDCO). The only known efficient excimer laser that emits directly in the desired spectral region (330–355 nm) is the XeF laser. However, this laser has several shortcomings. First, its spectrum contains a substantial amount of fine structure such that it is questionable whether its output can be frequency narrowed without a considerable loss in power and efficiency. Secondly, the range of tunability of this laser is very narrow (approximately 20 Angstrom) which is much narrower than required. As a result, even if the XeF laser can be narrowed and tuned, its wavelength may still result in suboptimal isotope separation. Also, the efficiency of the XeF laser, when pumped with an e-beam, is substantially lower than to be desired.

The technique and apparatus of the present invention overcomes the shortcomings of the prior art by employing a krypton fluoride (KrF) laser as the beam input source in conjunction with Raman shifting with a combination of three Raman cells, each of which has one of the gases $H_2$, HD, $D_2$ or $CH_4$ in predetermined combinations to provide the desired frequency shifting.

The shifting of the frequency of a laser output by means of one or more Raman mediums placed in the optical path of the laser is well known in the art and is described, for example, in U.S. Pat. Nos. 3,668,420 to Vanderslice, 3,941,670 to Pratt, Jr., 3,371,265 to Woodbury et al., 3,657,554 to Lumpkin et al., and 3,346,741 to G. Mayer et al.

A high power krypton fluoride laser using an electron beam pump is described in U.S. Pat. No. 4,063,192 to Bhaumik et al. and assigned to Northrop Corporation, the assignee of the present invention. This laser can be tuned by injection locking which is a technique well known in the art whereby a higher power laser can be locked to the frequency of a low power tunable laser such as a dye laser.

The present invention makes use of a krypton fluoride laser of the type described in U.S. Pat. No. 4,063,192 in combination with a plurality of Raman cells such as described in certain of the other aforementioned patents, with the combinations of the particular gases used in the cells being such as to provide a high power laser output in the 330–355 nm range which can efficiently cause the photopredissociation of formaldehyde (HDCO).

It is therefore an object of this invention to provide an efficient technique and apparatus for producing heavy water from formaldehyde by laser isotope separation.

It is a further object of this invention to provide a tunable high power laser output in the 330–355 nm range suitable for use in the photopredissociation of formaldehyde.

Other objects of this invention will become apparent as the description proceeds in connection with the accompanying drawing of which:

FIG. 1 is a functional block diagram illustrating the technique and apparatus of the invention, and FIG. 2 is a table illustrating the combined wavelength shifts obtainable with the system and technique of the invention with various combinations of gases.

Referring to the figures, a high power laser beam is generated by means of KrF laser 11 which is preferably an e-beam laser of the type described in the aforementioned U.S. Pat. No. 4,063,192, this laser having an output at approximately 249 nm. The laser beam successively passes through Raman cells 12, 13 and 14, each of these cells having a different predetermined gas therein selected from one of the following: $H_2$, $D_2$, $CH_4$ and HD. It has been found that the following wavelength regions for the laser output will induce photopredissociation of formaldehyde (HDCO): 330–332 nm; 338–340 nm; 344–345 nm; and 352–355 nm. The various gases used in the Raman cells produce the following wavelength shifts (in $cm^{-1}$): $H_2$ . . . 4155.2; $D_2$ . . . 2991.4; $CH_4$ . . . 2914; and HD . . . 3620.5.

FIG. 2 is a table illustrating the combined wavelength shifts achieved with various combinations of gases in the Raman cells using a KrF laser having an output at $40258 \pm 150\ cm^{-1}$. From the consideration of the shifts produced by the various bases described above in conjunction with FIG. 2, it should be apparent that the desired spectral regions can be almost completely covered using the given combinations of gases assuming a tunability of $300\ cm^{-1}$ for the KrF laser.

While the invention has been described and illustrated in detail, it is clearly to be understood that this is intended by way of illustration and example only and is not to be taken by way of limitation, the spirit and scope of this invention being limited only by the terms of the following claims.

I claim:

1. A method for generating a high power laser suitable for use in the photopredissociation of formaldehyde (HDCO) to produce heavy water ($D_2O$) comprising the steps of:

placing a plurality of Raman cells in the path of the beam of a high power krypton fluoride laser, placing in each Raman cell a gas selected from the class consisting of $H_2$, HD, $D_2$ and $CH_4$, the combination of said gases being such as to shift the wavelength of the beam of said laser to a wavelength in the range of 330–355 nm.

2. The method of claim 1 wherein three Raman cells are employed.

3. The method of claim 2 wherein one of said cells has $H_2$ therein while the others of said cells have $D_2$ therein.

4. The method of claim 2 wherein one of said cells has $D_2$ therein and the others of said cells have HD therein.

5. The method of claim 2 wherein one of said cells has $H_2$ therein, another of said cells has HD therein, and the third of said cells has $CH_4$ therein.

6. The method of claim 2 wherein one of said cells has $CH_4$, and the others of said cells have $H_2$ therein.

7. The method of claim 2 wherein one of said cells has $H_2$ therein, and the others of said cells have HD therein.

8. The method of claim 2 wherein one of said cells has HD therein, and the others of said cells have $H_2$ therein.

9. A laser system for generating high power output suitable for use in the photopredissociation of formaldehyde (HDCO) to produce heavy water (deuterium oxide) comprising:

a high power e-beam krypton fluoride laser, three Raman cells arranged in series in the beam path of said laser, said cells each having a gas contained therein selected from the class consisting of $H_2$, HD, $D_2$ and $CH_4$ to provide a predetermined combination of gases in said cells, whereby the wavelength of the laser beam is shifted by said combination of Raman cells to a wavelength between 330–355 nm.

* * * * *